United States Patent Office 3,108,926
Patented Oct. 29, 1963

3,108,926
PRODUCTION OF SHEET STRUCTURES COMPRISING FIBROUS MATERIALS AND GLASS FLAKELETS
Alfred Winsor Brown, Ridgewood, N.J., assignor to Owens-Corning Fiberglas Corporation, a corporation of Delaware
No Drawing. Filed Oct. 19, 1956, Ser. No. 616,929
1 Claim. (Cl. 162—156)

This invention relates to the production of sheet structures comprising fibrous materials and glass flakelets and to the production of such sheets containing these materials and a suitable binder.

Various paper-like sheet materials have heretofore been suggested, for example for use as facings on various laminated structures, as insulators, and as dielectric materials in various electrical applications. It has also been suggested that fibrous glass can be incorporated in such paper-like materials. The use of fibrous glass, by virtue of its great physical and dielectric strengths, appears, in the abstract, to be highly advantageous. It has been found, however, that, presumably by virtue of the extremely small diameter of fibers that can be employed, fibrous glass contributes little if anything to the dielectric strength of paper-like materials in which it is incorporated. It has also been suggested that glass flakes or platelets can be formed into papers, or paper-like sheets, and that, when the generally flat surfaces of the flakes or platelets are oriented parallel to the surface thereof, the sheets produced have substantially greater dielectric strengths than similar sheets reinforced either with fibrous glass or with cellulosic materials. However, it has been found to be difficult to accomplish uniform wetting of the flakes or platelets by any suitable binder that might be used to increase the strength of such sheets. If no binder is used, or if the flakes or platelets are not wet by a binder, sheets containing glass flakes lack the mechanical strength required for many applications for which they would otherwise be well suited.

The present invention is based upon the discovery that sheet materials having high strengths, both dielectric and mechanical and excellent flexural moduli and resistance to weathering can be produced with facility from mixtures of glass flakes and a fibrous material. If desired, a binder composition can also be used. Also, the finishing of a surface of the sheet material produced is facilitated when glass flakes, in addition to fibrous glass, are included therein. It is believed that the difficulty which heretofore has been encountered in finishing sheet materials reinforced with fibrous glass is attributable to the shrinkage of resinous binder around the fibers, and that the presence of the glass flakes minimizes the effect of such shrinkage.

It is, therefore, an object of the invention to provide an improved method for producing a structure of sheet form from a fibrous material and glass flakes or platelets.

It is a further object of the invention to provide a method for producing a sheet structure from a cellulosic material and glass plates or flakelets.

It is also an object of the invention to provide a method for producing a sheet structure from fibrous glass and glass flakes.

It is still another object of the invention to provide a sheet material comprising a fibrous material and glass flakes or platelets.

Other objects and advantages will be apparent from the description which follows, which is intended only to illustrate and disclose, but in no way to limit, the invention.

According to the invention an improved sheet structure is provided. Such sheet structure comprises a fibrous filler, for example cellulose or fibrous glass, and glass flakes or platelets. In a preferred embodiment such structure includes, in addition to a fibrous filler and glass flakes or platelets, a suitable resinous binder, which, most desirably, is hardened by the action of heat.

The invention also provides a method for producing such sheet materials. Such method includes the steps of effecting a uniform dispersion comprising glass flakes and a fibrous filler, forming a sheet from the resulting dispersion, and drying the dispersion while in sheet form.

In the production of a sheet material according to the invention it is preferred to employ from about 15% to about 95% of glass flakes, and from about 85% to about 5% of a fibrous filler. Even though substantial improvement may be achieved using the indicated materials in proportions outside the stated preferred range, optimum benefit from the use of the two different types of filler have been achieved using proportions within the range. Where a combination of high physical strength, including flexural modulus, and high dielectric strength, resistance to weathering, and ease of finishing are desired, it is preferred to employ from about 30% to about 90% of glass flakes and from about 70% to about 10% of a fibrous filler, and most desirable to employ from about 45% to about 80% of glass flakes and from about 55% to about 20% of a fibrous filler.

The terms "percent" and "parts" are used herein, and in the appended claims, to refer to percent and parts by weight, unless otherwise indicated.

A paper-like sheet material can be produced in accordance with the invention by forming a dispersion, for example using water as a dispersing medium, comprising a fibrous filler and flake glass, in the desired proportions, and then casting a film from the resulting dispersion, for example on a foraminous conveyor. Satisfactory results have been achieved using bleached kraft pulp and, if desired, fibrous glass, or merely just fibrous glass as the fibrous filler. Best results have been achieved by adding the desired amount of glass flakes to water, and maintaining the flake suspended in the water by appropriate agitation while mixing therewith a slurry or dispersion of the fibrous filler in water. The slurry or dispersion of fibrous filler in water can advantageously be effected in a beater of the type used in the paper making art, although other methods for forming such a slurry or dispersion can also be used if desired. The resulting slurry comprising glass flakes, a fibrous filler, and water or other dispersing medium can then be formed into a sheet by the usual casting technique employed in paper making, and most of the water or other dispersing medium allowed to flow from the cast sheet through the foraminous conveyor. Such a sheet dries rapidly to a condition in which it is self-supporting, and can be removed from the foraminous conveyor and further processed, for example heated to volatilize additional water or other dispersing medium, and calendered, if desired.

The resulting paper-like sheet constitutes excellent sheet insulation material, having approximately twice the dielectric strength of ordinary paper, can be used as a decorative material, for example in the fabrication of lamp shades, or can be employed as reinforcement for various plastic articles.

When, as is often desired, a resinous material is used as a binder in producing paper-like sheet materials in accordance with the invention, excellent results can be achieved by adding a resin to the beater used to produce the uniform dispersion or slurry comprising the fibrous filler and water or other dispersing medium. Excellent results have been achieved using the so-called "beater additive resins" which are employed in the paper making art. As examples of such resins specific mention can be made of phenolics, urea-aldehydes, epoxys, melamine-aldehydes, polyesters, vinyl methyl ether maleic anhydride copolymers, polystyrenes, and polyvinylpyrolidones. The choice of a particular resin for this purpose is not limited by the chemical characteristics thereof, except for usual considerations as to suitability for intended end use for the paper-like sheet material. From the standpoint of suitability for use in the process, however, any resinous material that can be formed into a reasonably stable suspension with the fibrous filler and water can be employed. The presence of the fibrous filler substantially facilitates wetting of the flake glass by the resinous material, with the consequence that gas-filled voids which are encountered when it is attempted to produce paper from a dispersion comprising glass flakes, resin and water, are eliminated or minimized. Heat hardenable resinous binders are ordinarily preferred for this use because they are usually more stable and inert in the finished paper-like sheet material. The fibrous filler also assists, whether or not a binder is used, in orienting glass flakes with their major surfaces parallel to the major surfaces of the sheet material.

In general, as is indicated above, a binder, when employed, should constitute not more than about 10% of the finished sheet material. Satisfactory sheet materials can be formed without the use of any binder. The purpose of a binder, when employed, is usually to increase the strength or water repellancy of the resulting material. For this purpose, the use of more than about 10% of the binder is comparatively ineffective. In order to achieve appreciable improvement of these characteristics it is usually preferred, when a binder is employed, to use at least about 1% thereof.

The following examples are presented solely for the purpose of further illustrating and disclosing the invention, and are in no way to be construed as limitations thereon.

*Example 1*

A charge of 25 parts of kraft cellulose pulp was formed into a uniform dispersion with 1000 parts of water in a beater of the type commonly used in paper making to produce uniform dispersions of pulp in water. The resulting dispersion was added to an agitated suspension of 75 parts of glass flakes in 500 parts of water. The resulting mixed slurry, comprising glass flakes, kraft cellulose pulp and water was cast onto a foraminous conveyor, was allowed to stand thereon for about three minutes until most of the water had separated from the sheet and flowed through the conveyor. The resulting partially dried sheet was then heated to about 220° F. for approximately 45 seconds, and was calendered. The resulting paper had a thickness of about 0.005 inch, had approximately twice the dielectric strength of ordinary kraft paper of the same thickness, and had approximately the same mechanical strength as did a sheet of paper made from glass flakes and an epoxy resin binder, having the same flake content and thickness. In addition, the paper constituted an excellent vapor barrier and was suitable for impregnation with any desired resinous material for use in the production of laminated articles or paper-reinforced moldings.

The procedure set forth in the preceding paragraph was repeated, except that a greater volume of the slurry was cast onto the same area of the foraminous conveyor so that the finished sheet had a thickness of about 0.015 inch.

*Example 2*

The procedure described in Example 1 was also repeated to form a uniform dispersion from 50 parts of kraft cellulose pulp with 1000 parts of water, and the resulting dispersion was added to an agitated suspension of 50 parts of glass flakes in 500 parts of water. Paper-like sheets 0.005 inch in thickness and 0.015 inch in thickness were produced.

The procedures described in Examples 1 and 2 can also be repeated, but using, on a dry-solids basis, from 1% to 10% of a beater additive resin of any of the types previously discussed.

When a paper is produced in accordance with the invention from a mixture of glass fibers, glass flakes and a transparent, heat-hardenable resinous binder it is possible to convert the sheet into a polarizing element by subjecting it, after cure of the resin, to an elevated temperature, preferably from 15 to 30° F. higher than the normal curing temperature of the particular resin. Although the mechanism responsible for producing a polarizing element by such treatment is not fully understood, it has been repeatedly demonstrated that the treatment is effective. It will be appreciated that glass fibers tend to counteract the polarizing effect of the glass flakes acting, in essence, as light diffusers, so that where polarization is particularly desired in a sheet material according to the invention a relatively low percentage of glass fibers should be employed, for example from about 5% to about 10%, based upon the total of glass flakes and glass fibers.

Various sheet materials for use as facings on plywood have heretofore been suggested. For example, plywood has been faced with unreinforced transparent plastic materials. Facing materials have also been produced from various resinous materials, cellulose pulp fibers, and fine glass fibers. In a specific instance, such a facing material was produced from bleached pulp, a melamine resin and glass fibers. The bleached pulp and a melamine formaldehyde resin commercially available under the trade designation "Plaskon 3381" were beat for 35 minutes with water; glass fibers having an average diameter of 0.0002" were added to the resulting slurry; and beating was continued for an additional 5 minutes. The proportions of the various ingredients used were 2 parts of the cellulose, 18 parts of glass, and 80 parts of the melamine resin, together with sufficient water to give a reasonable working viscosity. Sheets produced from this slurry by the casting, drying and calendering techniques described in Example 1 showed promise as facing materials for plywood or the like, except that no completely transparent facing was achieved. It is believed that some improvement in this respect can be realized by proper selection of the cellulose pulp, but that more nearly transparent facing materials for such use can be produced in accordance with the instant invention using mixtures of glass flakes, a fibrous filler and, if desired, a resinous binder.

It will be apparent that various changes and modifications can be made from the specific details disclosed in the foregoing examples, and discussed herein without departing from the spirit and scope of the appended claim.

What I claim is:

A paper-like sheet material which consists essentially of from 45% to 95% of glass flakes and from 55% to 5% of fibrous glass, and wherein the glass flakes are predominantly oriented with their major surfaces parallel to the major surfaces of the sheet material.

References Cited in the file of this patent

UNITED STATES PATENTS

| | | |
|---|---|---|
| 726,485 | Whitney | Apr. 28, 1903 |
| 1,868,566 | Crossman | July 26, 1932 |
| 2,233,259 | Harth | Feb. 25, 1941 |
| 2,457,785 | Slayter | Dec. 28, 1948 |
| 2,504,744 | Sproull et al. | Apr. 18, 1950 |
| 2,694,630 | Landes et al. | Nov. 16, 1954 |